No. 624,143. Patented May 2, 1899.
M. A. WILLUMSEN.
COMBINED CAR AND AIR BRAKE COUPLING.
(Application filed Apr. 23, 1898.)
(No Model.) 3 Sheets—Sheet 1.
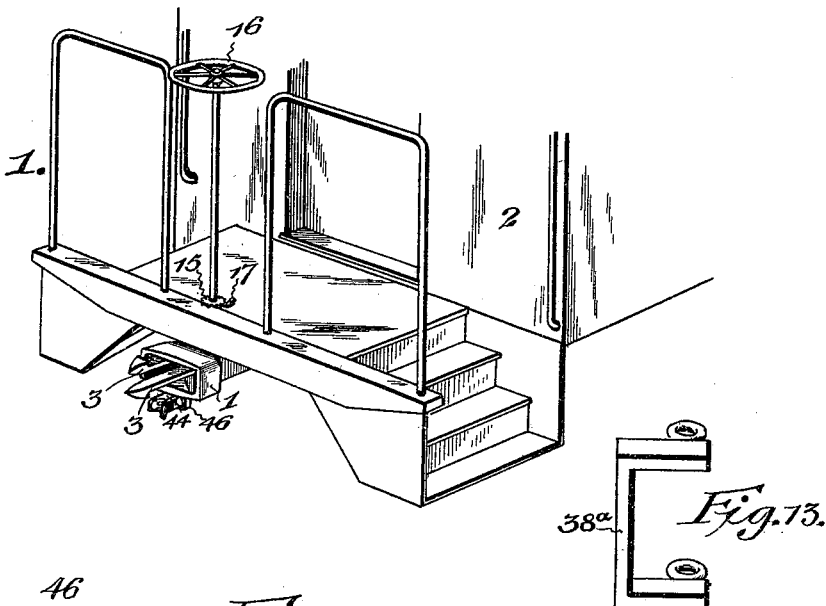
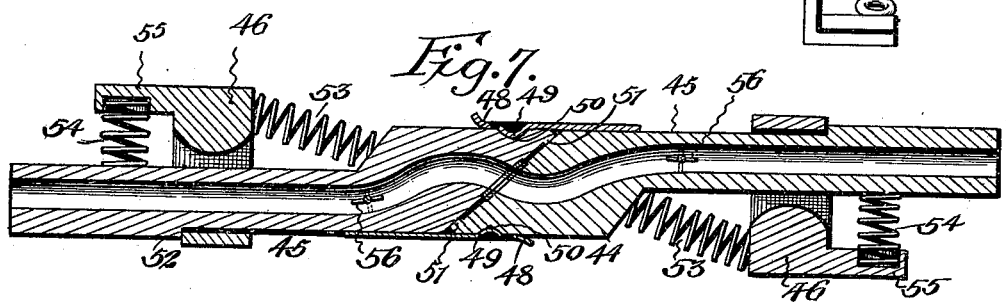
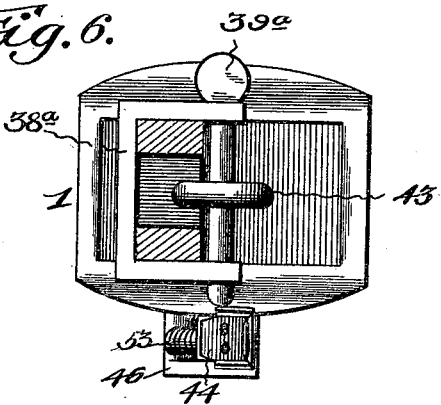
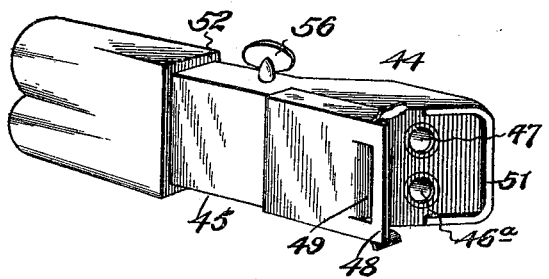
Witnesses  Martin A. Willumsen, Inventor,
By his Attorneys,

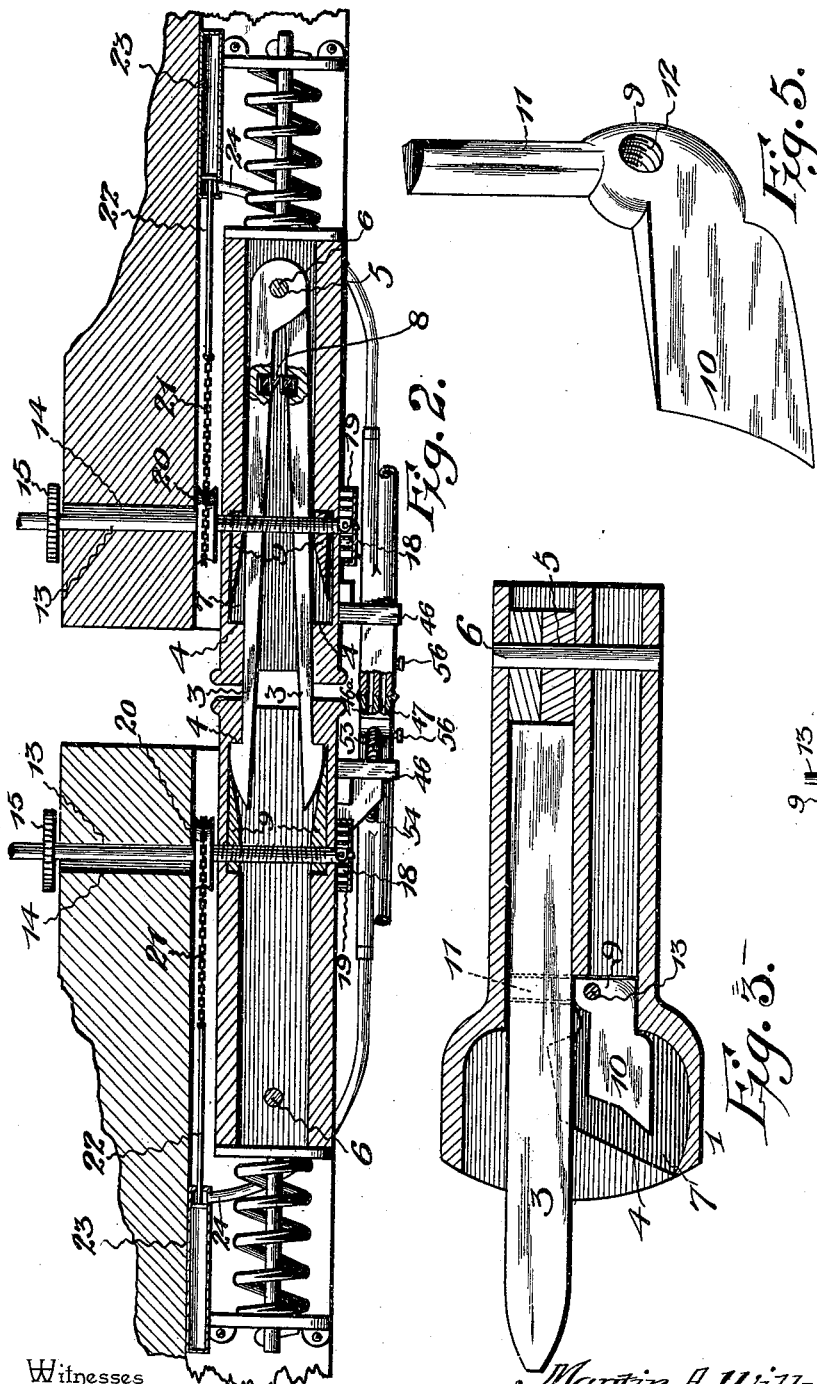

No. 624,143. Patented May 2, 1899.
M. A. WILLUMSEN.
COMBINED CAR AND AIR BRAKE COUPLING.
(Application filed Apr. 23, 1898.)
(No Model.) 3 Sheets—Sheet 3.
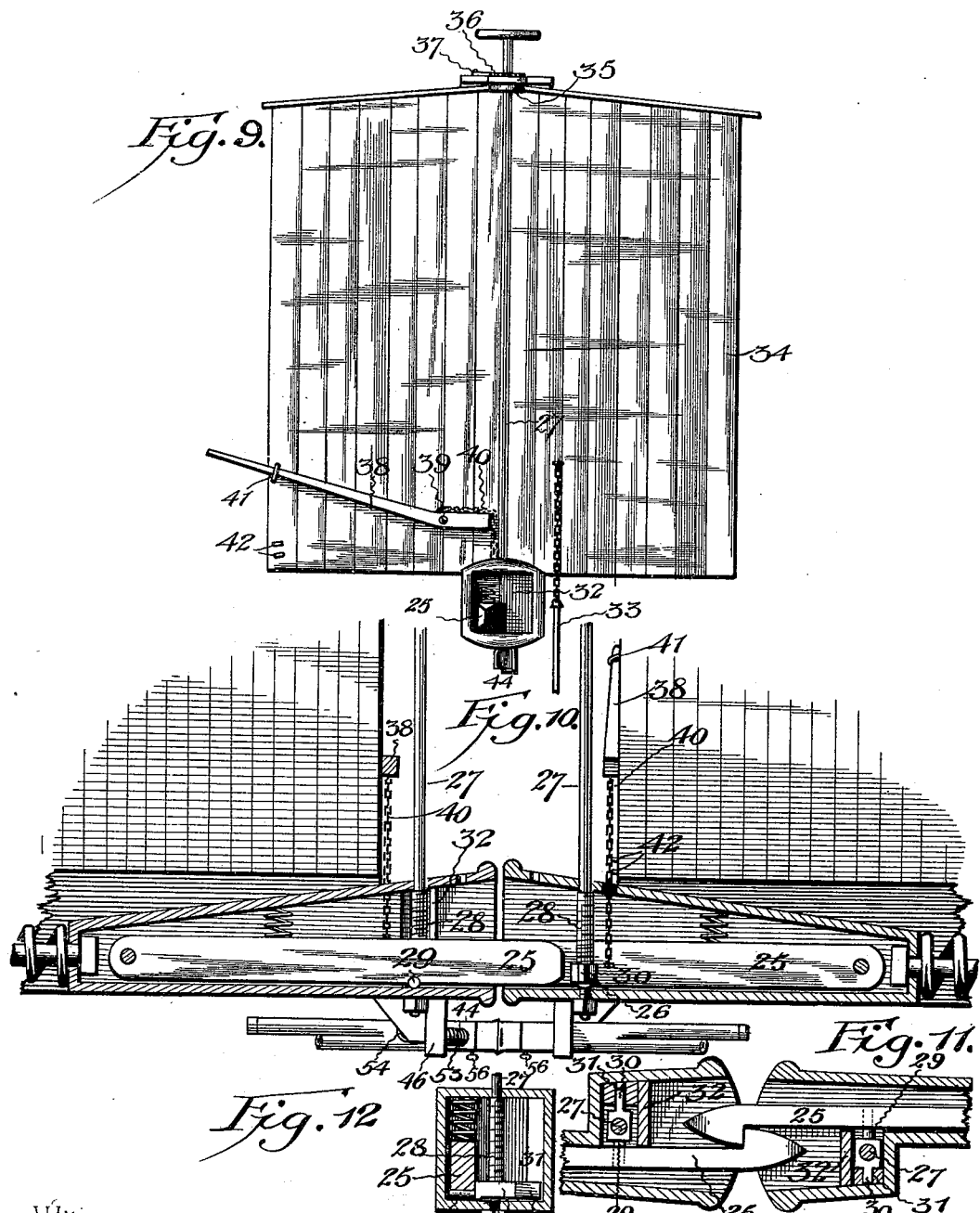

UNITED STATES PATENT OFFICE.

MARTIN A. WILLUMSEN, OF MURRAY, UTAH.

COMBINED CAR AND AIR-BRAKE COUPLING.

SPECIFICATION forming part of Letters Patent No. 624,143, dated May 2, 1899.

Application filed April 23, 1898. Serial No. 678,626. (No model.)

*To all whom it may concern:*

Be it known that I, MARTIN A. WILLUMSEN, a citizen of the United States, residing at Murray, in the county of Salt Lake and State of Utah, have invented a new and useful Combined Car and Air-Brake Coupling, of which the following is a specification.

The invention relates to improvements in combined car and air-brake couplings.

The object of the present invention is to improve the construction of car-couplings and to provide a simple, inexpensive, and efficient one capable of automatic operation when two cars come together for coupling and adapted to be readily uncoupled from the top and sides of a box-car and the platform of a coach and also from the cab of a locomotive.

A further object of the invention is to provide a car-coupling which will be automatically uncoupled should a car be overturned, and thereby prevent an overturned car from derailing others and dragging them after it down an embankment or the like.

Another object of the invention is to provide a car-coupling which will couple and uncouple under all conditions to which a car may be subjected, such as a curve or when a train is in motion and it is desired to make a running switch.

The invention also has for its object to provide an air-brake coupling designed to be mounted on and carried by the car-coupling and capable of automatic operation to engage and release a corresponding air-brake coupling when the car-coupling is coupled and uncoupled.

Another object of the invention is to enable the air-brake coupling to yield to all the movements of the draw-head incident to longitudinal play and lateral vibration without breaking the connection or permitting any of the air to escape, so that the pressure of the air in the train-pipe of the air-brake cannot become accidentally reduced and effect a partial application of the brakes.

Another object of providing an air-tight connection between the air-brake couplings is to render the operation of the mechanism for uncoupling the cars from the cab of a locomotive positive and reliable and to prevent such mechanism from becoming impaired through loss of air in the pipe connections.

The invention consists in the construction and novel combination and arrangement of parts hereinafter fully described, illustrated in the accompanying drawings, and pointed out in the claims hereto appended.

In the drawings, Figure 1 is a perspective view of a combined car and air-brake coupling constructed in accordance with this invention. Fig. 2 is a longitudinal sectional view showing two cars coupled. Fig. 3 is a horizontal sectional view of one of the draw-heads. Fig. 4 is a transverse sectional view. Fig. 5 is a detail perspective view of one of the uncoupling plates or jaws. Fig. 6 is a front elevation, partly in section, illustrating the manner of mounting a link on the arrow-shaped jaws. Fig. 7 is a horizontal sectional view of the air-brake couplings. Fig. 8 is a perspective view of one of the air-brake couplings. Fig. 9 is an elevation illustrating a modification of the car-coupling. Fig. 10 is a longitudinal sectional view showing two cars coupled. Fig. 11 is a horizontal sectional view of the same, illustrating the manner of interlocking the arrow-headed jaws. Fig. 12 is a transverse sectional view of one of the draw-heads. Fig. 13 is a detail perspective view of the coupling yoke or frame.

Like numerals of reference designate corresponding parts in all the figures of the drawings.

1 designates a draw-head mounted on a car 2 in any suitable manner and provided with a pair of pivoted semiarrow-headed jaws 3, arranged one above the other, provided with smooth inner contiguous faces and provided at their outer ends with heads extending upward from the upper jaw and downward from the lower jaw and adapted to engage shoulders 4 at the top and bottom of a corresponding draw-head. The jaws, which are provided at their inner ends with eyes 5, are mounted on a horizontal pivot 6, consisting of a transverse pin or other suitable fastening device, and the shoulders 4, which are engaged by the jaws, are formed by recessing the upper and lower walls of the draw-head, as shown at 7. The jaws swing in a vertical plane and are drawn together to effect the operation of uncoupling, and they are expanded automatically when they are free to do so by a coil-spring 8, interposed between the jaws, adjacent to the pivoted ends thereof, and seated in suitable sockets of the same, as clearly shown in Fig. 2 of the accompanying drawings.

When two draw-heads are coupled, they are connected by two pairs of jaws, which make a perfectly safe and strong connection and provide a practically indestructible car-coupling. The reeeses 7, which are engaged by the jaws, are provided with angularly-disposed front walls to form the shoulders 4, and they receive upper and lower uncoupling plates or jaws 9, adapted to compress the jaws and disengage their heads from the shoulders 4. The uncoupling plates or jaws 9, which are substantially L-shaped, as clearly shown in Fig. 5 of the accompanying drawings, consist of a longitudinal plate or body portion 10 and a transverse arm 11 and are adapted to engage both sets of jaws, whereby the uncoupling mechanism of one car only is operated to effect the operation of uncoupling. The transverse arm 11 of the uncoupling plate or jaw 9 is arranged in a transverse branch of the recess 7, and these arms are adapted to engage and operate the jaws, which are pivoted in the same draw-head, the plates or body portions 10 operating to disengage the jaws of the other draw-head. When the uncoupling plates or jaws are drawn together by the means hereinafter described, their longitudinal body portions 10 are carried to a position substantially flush with the top and bottom walls of the draw-head to permit the jaws of the other draw-head to be readily withdrawn to uncouple the cars.

The uncoupling plates or jaws are provided at their angles with openings 12, having right and left hand threads, which are engaged by right and left hand threaded portions of a vertical shaft 13, adapted to be rotated from the top and sides of the box-car, the platform of a coach, and the cab of a locomotive to effect the operation of uncoupling from those points. The shaft 13, which extends through a slot 14 of the platform of the car 2, carries a ratchet-wheel 15 and is operated by a hand-wheel 16, and in practice the threads of the shaft 13 and those of the uncoupling plates or jaws will be preferably of a pitch to produce a complete uncoupling by three rotations of the shaft, but the pitch of the threads may be varied to produce the desired operation of the uncoupling mechanism.

The ratchet-wheel 15 is engaged by a pawl 17 to maintain the draw-heads uncoupled, and the pawl is preferably spring-actuated to render its operation automatic, although the spring may be omitted, if desired. The lower end of the shaft 13 extends through the bottom of the draw-head and is connected to the inner end of a barrel-spring 18, mounted within a casing 19 at the bottom of the draw-head, and the outer end of the spring 18 is suitably secured to the casing of the draw-head. When the shaft 13 is rotated to effect the operation of uncoupling, the barrel-spring is wound up and is adapted when the pawl is thrown out of engagement with the ratchet-wheel to rotate the shaft automatically and separate the links and return the latter to their position for automatic coupling.

In order to enable the operation of uncoupling to be performed by the engineer of a train without leaving the cab of his locomotive, a pulley 20 is mounted on the shaft 13, preferably at a point between the draw-head and the platform of the car, and a chain 21, which is wound around the pulley, is connected with a piston 22 of a cylinder 23. The pulley is grooved to receive the chain 21, and air is admitted at the outer end of the cylinder through a pipe 24 and is adapted to reciprocate the piston, whereby the shaft is rotated to bring the jaws together. When the jaws are free to separate and return to their position for automatic coupling, the piston of the cylinder is reciprocated and carried outward to its initial position by the barrel-spring 18. The barrel-spring 18, although it is located in the accompanying drawings at the bottom of the draw-head, may be arranged at any other desired point, as will be readily understood. The air-pipes 24 of the car are coupled by the means hereinafter described, and suitable means are designed to be provided in the cab of a locomotive to enable the passage of air through such air-pipes to be under the control of the engineer, so that he may uncouple the cars when desired. This uncoupling of cars from the locomotive may be desirable in the event of an accident, and the operation of uncoupling can be performed while a train is in motion and running at the highest rate of speed, and this will enable a running switch to be made without danger.

Instead of providing a pair of jaws for each draw-head the car-coupling may be simplified for freight-cars, as illustrated in Figs. 9 to 12, inclusive, of the accompanying drawings. In this form of the invention a single jaw 25 is employed and is provided, as clearly shown in Fig. 11, with a laterally-projecting head adapted to interlock with a corresponding jaw. Either jaw may be lifted out of engagement with the other by means of an uncoupling jaw or device 26, operated by a vertical shaft 27, having a threaded portion 28, engaging a threaded opening of the device 26. The threaded opening is located at the center of the uncoupling device, which has one arm 29 arranged beneath the adjacent jaw, and its other side 30 engages a vertical guide 31 of the draw-head, whereby the uncoupling device is prevented from rotating on the same.

The jaw 25 is located at one side of the draw-head, which is provided at its opposite side with a vertical partition 32, forming an opening for guiding the link in its vertical movement. The draw-head is provided with a coupling-pin perforation adapted to receive an ordinary coupling-pin 33 for enabling the draw-head to be coupled with an ordinary pin-and-link draw-head.

The shaft 27 extends to the top of the car 34 and is connected with a spring arranged within the casing 35 and constructed similar to that heretofore described. The shaft also carries a ratchet-wheel 36, arranged at the top of the car and engaged by a pawl 37.

The operation of uncoupling is performed at the side of the car by means of a lever 38, fulcrumed between its ends at 39 and disposed transversely of the car. The inner portion or arm of the lever is connected by a chain 40 with the link 25, whereby when the outer portion or arm of the lever is swung downward the link will be lifted out of engagement with the link with which it is interlocked. The outer portion of the lever 33 is normally arranged in a suitable support 41, such as a hook, and it is adapted to engage suitable stops 42 to maintain the link in an elevated position.

When it is desired to couple the draw-head 1 with a pin-and-link draw-head, a yoke or frame 38$^a$ is employed, and consists of upper and lower horizontal arms and a vertical connecting-piece. This yoke or frame is adapted to be mounted on the upper and lower links 3, as illustrated in Fig. 6 of the accompanying drawings, and its upper and lower arms, which engage the heads of the links, are extended laterally beyond the shanks of the same and are provided with perforations for the reception of a coupling-pin 39$^a$, which engages an ordinary link 43.

The air-brake coupling consists of a coupler-head 44, having a shank 45 and mounted in a bracket 46, which depends from the bottom of the draw-head. The coupler-head 44, which is provided with two air-passages 46$^a$ and 47, has its engaging face cut at an angle and adapted to abut against a corresponding coupler-head, as clearly shown in Fig. 7 of the accompanying drawings. In plan view the coupler-head is tapering, and it is provided opposite its angularly-disposed abutting face with a projecting casing 48, adapted to receive the nose or end of the adjacent coupler-head, whereby the two coupler-heads are securely held against lateral separation when two cars are coupled. The casing is provided at its top, bottom, and side with flanges, forming a flaring mouth for directing the coupler-heads in engagement with each other. The casing is also provided with an inwardly-extending flange 49, adapted to engage a corresponding recess 50 of the opposed coupler-head.

The air-passage 46$^a$ of the coupler-head 44 is designed to connect with the air-pipe 24, and the other air-passage 47 is intended to connect with the train-pipe of the ordinary air-brake mechanism, and the face or end of the coupler-head is designed to be provided around the passages 46$^a$ and 47 with elastic gaskets or washers adapted to be compressed to form an air-tight joint when the parts are coupled.

The coupler-head 44 is provided at its outer or engaging end with a marginal flange 51, extending around the upper, lower, and outer edges and disposed over the outer half of the coupler-head, the inner half of the surface of the coupler-head being adapted to receive the flange of the other coupler-head. The flange 51, which is substantially U-shaped, may be secured to the coupler-head 44 in any suitable manner and is designed to consist of a permanent horseshoe-magnet, the magnet of the two coupler-heads being reversed and adapted to attract each other as well as the coupler-heads, which are designed to be constructed of a metal which will be attracted by the magnets. By this construction the coupler-heads are firmly interlocked and an air-tight joint is provided, so that there is no liability of permitting any escape of the air, which might effect a reduction of pressure in the same pipe or interfere with the operation of the mechanism for uncoupling cars from the cab of a locomotive.

In order to enable the coupler-heads 44 to remain in alinement and also to prevent them from separating through the longitudinal movement and lateral vibration of the draw-heads, the shanks 45 of the coupler-heads 40 are loosely arranged in the brackets 46, being provided with shoulders 52 to limit the longitudinal movement. The brackets 46 are provided with openings to receive the shanks of the coupler-heads, and they form bearings for front and rear springs 53 and 54. The front spring 54 is interposed between the bracket 46 and the shoulder formed by the back of the coupler-heads 44, and it is arranged at a slight angle to the shank. The rear spring 54, which is disposed transversely of the car, engages one side of the shank 45 and a rearwardly-extending arm 55, which is provided with a socket to receive the outer end of the spring 54. The springs 53 and 54 by being arranged in this manner yieldingly support the coupler-heads and permit the same to remain in alinement during the movement of the draw-heads incident to the vibrations of the cars and the strain on the same.

Each coupler-head 44 is provided with a suitable valve 56, which enables the passages 46 and 47 at the rear end of the train to be closed, and any desired form of cock or valve may be employed.

The invention has the following advantages:

The car-coupling, which is simple and comparatively inexpensive in construction, possesses great strength and durability, is adapted to be coupled and uncoupled from the tops and sides of box-cars and the platforms of coaches without going between the cars, and it may also be uncoupled from the cab of a locomotive without necessitating the engineer leaving the same.

The car-coupling is adapted to couple and uncouple under all the varying conditions to which a car may be subjected whether at a standstill or in motion, and it is also capable of enabling a running switch or similar operations to be performed without danger to the train-hands. Should a car be overturned, it will uncouple itself automatically, so that there is no liability of one car dragging another after it down an embankment or precipice.

The device readily adjusts itself to any curve without increasing the play between the couplings and without strain on the draw-draw-heads. The four links form a double coupling and insure a direct central draft.

The air-brake couplings are purely automatic in their operation of coupling and uncoupling. They provide air-tight joints which cannot become broken through the vibration and longitudinal movement of the heads, and they are adapted to yield to the movements of the same.

Various changes in the form, proportion, and arrangement of the parts may be resorted to without departing from the spirit or sacrificing any of the advantages of the invention.

What I claim is—

1. In a device of the class described, the combination of a draw-head, a vertically-swinging jaw mounted within the draw-head on a horizontal pivot and extending outward beyond the draw-head and adapted to enter a corresponding draw-head, a vertical shaft arranged at one side of the jaw and having screw-threads, and a horizontal uncoupling device engaged by said screw-threads and having an arm extending beneath the said jaw, whereby the jaws of both draw-heads are disengaged, substantially as described.

2. In a device of the class described, the combination of a draw-head, a pair of horizontally-pivoted jaws arranged within the draw-head and adapted to swing vertically, said jaws extending beyond the draw-head and provided at their outer sides with engaging portions, adapted to interlock with the top and bottom of a corresponding draw-head, and uncoupling devices located above and below the jaws and adapted to compress simultaneously the jaws of both draw-heads to disengage each set, substantially as and for the purpose described.

3. In a device of the class described, the combination of a draw-head provided at its top and bottom with recesses, a pair of horizontally-pivoted jaws mounted within the draw-head and arranged to swing vertically, said jaws extending beyond the draw-head and adapted to engage the top and bottom of a corresponding draw-head, uncoupling devices arranged in said recesses in position for engaging both sets of jaws of two draw-heads, and means for raising and lowering the uncoupling devices, substantially as described.

4. In a device of the class described, the combination of a draw-head provided with opposite recesses forming shoulders, a pair of jaws having heads adapted to engage the shoulders of the corresponding draw-head, the uncoupling devices having longitudinal body portions arranged in said recesses and adapted to engage the jaws of a corresponding draw-head, said uncoupling devices being provided with transversely-disposed arms arranged at the outer faces of and adapted to engage the said jaws, and means for operating the uncoupling devices, substantially as described.

5. In a device of the class described, the combination of a draw-head provided with opposite recesses forming shoulders, a pair of jaws, the substantially L-shaped uncoupling devices having arms to engage the jaws, and provided with longitudinal body portions arranged in said recesses and adapted to engage the jaws of a corresponding draw-head, and a threaded shaft engaging and operating the uncoupling devices, substantially as described.

6. In a device of the class described, the combination of a draw-head, a jaw, an uncoupling device engaging the jaw and having a threaded opening, a shaft having a threaded portion engaging the opening of the uncoupling device, a barrel-spring connected with the shaft and adapted to be wound up by the same during the uncoupling operation, whereby it is capable of returning the parts to their initial position, and means for holding the shaft against rotation, substantially as described.

7. In a device of the class described, the combination of a draw-head, a jaw, a shaft provided with means for uncoupling the jaw, a pulley connected with the shaft, a cylinder having a piston adapted to be reciprocated by compressed air, and a flexible connection between the piston and the pulley, substantially as described.

8. In a device of the class described, the combination with a pair of longitudinal jaws, of a transverse yoke arranged on and detachably engaging the jaws contiguous to their engaging portions and extending from one side of the same and provided with perforations, and a coupling-pin arranged in the perforations, securing the yoke to the jaws and adapted to connect the same with an ordinary pin-and-link car-coupling, substantially as described.

9. In a device of the class described, the combination of a bracket, a coupler-head having a shank loosely arranged in the bracket, the front spring arranged at an angle to the shank and interposed between the bracket and the coupler-head, and the transversely-disposed rear spring engaging the shank, substantially as described.

10. In a device of the class described, the combination of a bracket having a rearwardly-disposed arm, a coupler-head having a shank arranged in the bracket and provided with a shoulder or stop engaging the same, the transverse spring located in rear of the bracket and interposed between the arm and the shank, and the front spring mounted on the shank and engaging the coupler-head, substantially as described.

11. In a device of the class described, the combination of a coupler-head provided at one side with a recess, and having an angularly-disposed end face a casing, projecting from the inner portion of the end face, and a resilient flange or projection arranged at the inside of the casing and adapted to engage the recess of a corresponding coupler-head, substantially as described.

12. In a device of the class described, the combination of a coupler-head having a flat angularly-disposed end face and provided at the outer edge thereof with a substantially U-shaped marginal flange, and a device mounted adjacent to the inner edge of said face and adapted to engage the exterior of a corresponding coupler-head, substantially as described.

13. In a device of the class described, a coupler-head having a casing and provided with a permanent horseshoe-magnet forming a substantially U-shaped flange, substantially as described.

In testimony that I claim the foregoing as my own I have hereto affixed my signature in the presence of two witnesses.

MARTIN A. WILLUMSEN.

Witnesses:
JOHN H. SIGGERS,
FRANCES PEYTON SMITH.